United States Patent
Battles et al.

(10) Patent No.: US 11,584,593 B1
(45) Date of Patent: Feb. 21, 2023

(54) AUTOMATIC ROTARY INSERTING MACHINE

(71) Applicant: Amazon Technologies, Inc., Seattle, WA (US)

(72) Inventors: Jon Stuart Battles, North Bend, WA (US); William Scott Kalm, Seattle, WA (US); Kent Belden Meiswinkel, Seattle, WA (US); Kevin Senh Ly, Seattle, WA (US); Dinesh Mahadevan, Everett, WA (US); Peter A. Grant, Seattle, WA (US); Bob Samac, Cle Elum, WA (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

(21) Appl. No.: 16/831,431

(22) Filed: Mar. 26, 2020

(51) Int. Cl.
| | |
|---|---|
| *B65G 29/00* | (2006.01) |
| *B65G 47/38* | (2006.01) |
| *B65B 35/26* | (2006.01) |
| *B65G 47/82* | (2006.01) |
| *B65G 47/26* | (2006.01) |

(52) U.S. Cl.
CPC ............. *B65G 29/00* (2013.01); *B65B 35/26* (2013.01); *B65G 47/261* (2013.01); *B65G 47/38* (2013.01); *B65G 47/82* (2013.01); *B65G 2201/02* (2013.01)

(58) Field of Classification Search
None
See application file for complete search history.

(56) References Cited

U.S. PATENT DOCUMENTS

| | | | | |
|---|---|---|---|---|
| 2,626,702 | A | * | 1/1953 | Basus ..................... B65B 43/56 198/476.1 |
| 3,306,426 | A | * | 2/1967 | Arnold ................... B65G 29/00 74/56 |
| 4,464,884 | A | | 8/1984 | Franks |
| 4,856,956 | A | | 8/1989 | Zur |
| 5,915,525 | A | | 6/1999 | Baker et al. |
| 6,247,577 | B1 | * | 6/2001 | Dahlgrun ............. B65G 47/848 198/417 |
| 7,334,676 | B1 | | 2/2008 | Mcgourin et al. |
| 7,798,308 | B2 | | 9/2010 | Ranger |
| 8,739,959 | B2 | * | 6/2014 | Breil .................... B65G 47/847 198/470.1 |
| 9,284,132 | B2 | * | 3/2016 | Hawighorst ........... B65H 29/20 |
| 9,884,732 | B2 | * | 2/2018 | Antoniazzi ............ B65G 17/16 |
| 10,611,571 | B2 | * | 4/2020 | Bouche ................. B65G 29/02 |
| 10,618,732 | B2 | | 4/2020 | Iwata et al. |
| 10,994,939 | B2 | | 5/2021 | Garbagnati et al. |

OTHER PUBLICATIONS

U.S. Appl. No. 16/703,755, "Item Loading By Chamber Bounded By Synchronized Conveying Surfaces" Dec. 4, 2019, 45 pages.

* cited by examiner

*Primary Examiner* — Kavel Singh
(74) *Attorney, Agent, or Firm* — Kilpatrick Townsend & Stockton LLP

(57) ABSTRACT

A loading system (e.g., in a warehouse or other item-fulfillment environment) can include a rotary hub that supports one or more chambers. In a first orientation of the rotary hub, one of the chambers may be in a first position aligned for item receipt (e.g., through an open top of the chamber by feeding from a conveyor belt or other feeding system). The rotary hub can rotate to a second orientation in which the chamber is in a second position aligned for item discharge (e.g., through an open end of the chamber and into a receiving zone of a packaging machine or other system).

20 Claims, 9 Drawing Sheets

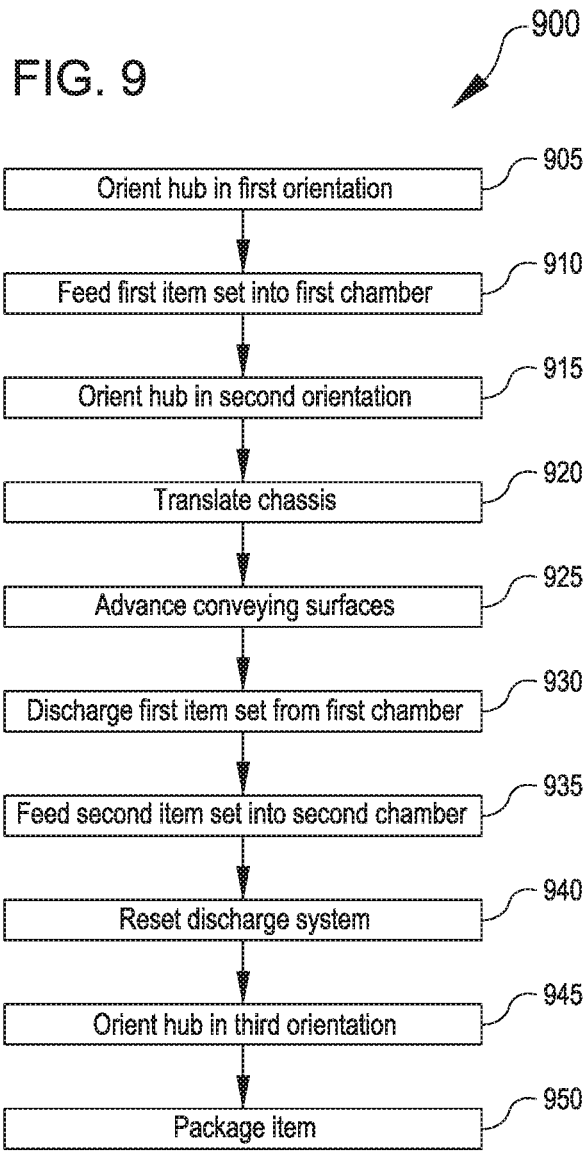

AUTOMATIC ROTARY INSERTING MACHINE

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space and equipment, can result in lower throughput, unacceptably long response times, an ever-increasing backlog of unfinished tasks, and, in general, poor system performance. Speed, reliability, scalability, and other criteria may be pertinent areas for improvement, notwithstanding that a gain in one area may often yield a corresponding tradeoff in another.

BRIEF DESCRIPTION OF THE DRAWINGS

Various embodiments in accordance with the present disclosure will be described with reference to the drawings, in which:

FIG. 9 is a flow chart illustrating an example of a process that may be performed by elements of the inventory management system of FIGS. 1 through 8, according certain embodiments.

DETAILED DESCRIPTION

Figure 1:
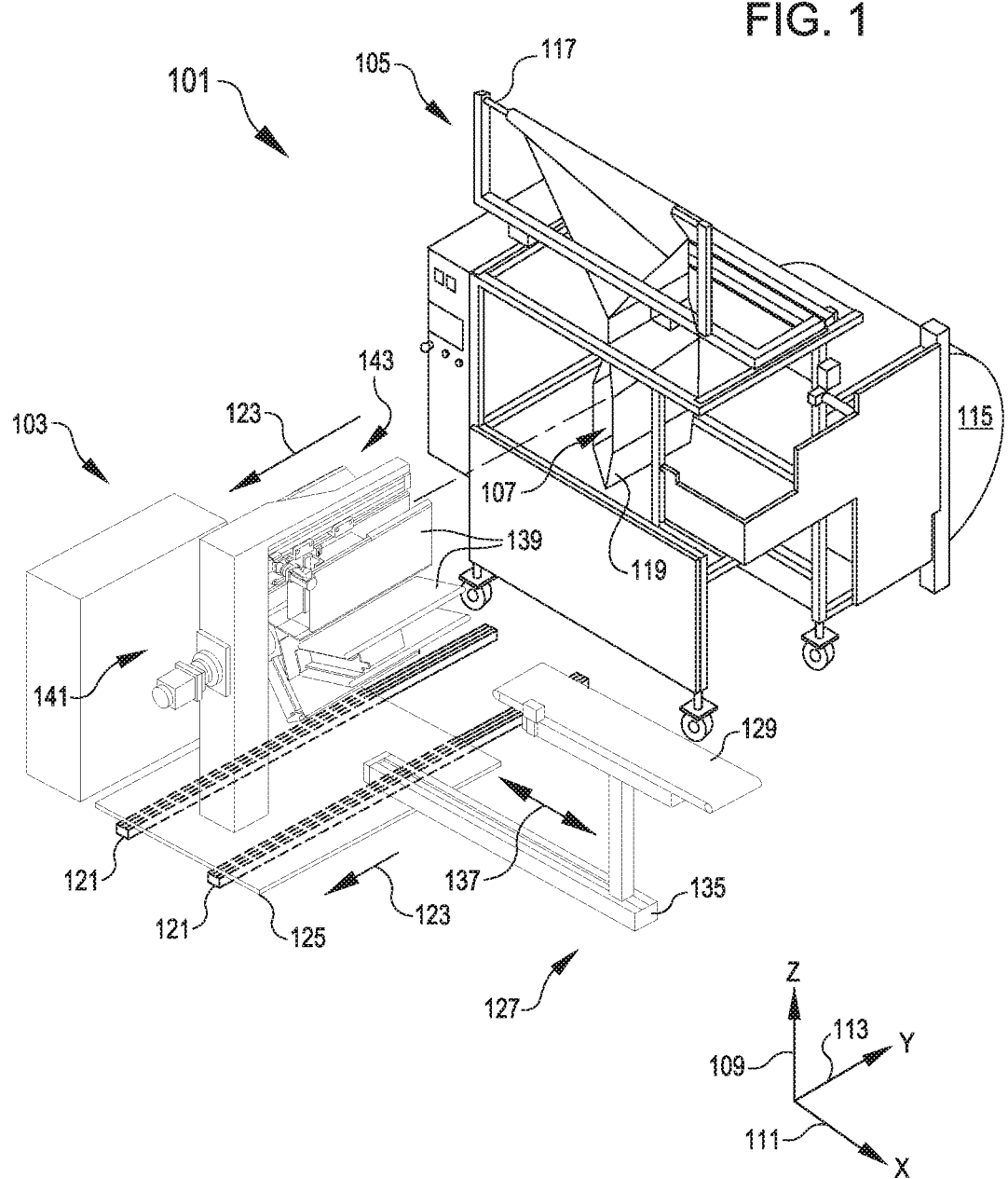
FIG. 1 is a perspective view showing an inventory management system with elements of a loading system separated from elements of a packaging machine, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein may pertain to inventory management systems. Disclosed components may facilitate automatic loading of items into a front-facing opening of a packaging system or other relevant receiving zone. In some embodiments, systems may correspond to add-on machines or components that can facilitate loading of existing machines, although the disclosure herein is not so limited.

In some embodiments, a packaging machine may arrange packaging to provide or present an opening that faces in a forward direction. Such an orientation may present challenges to automated loading of such an arrangement. In some examples, a frame bearing suitable subcomponents can be positioned in an appropriate position relative to the packaging machine to allow for automated loading into the difficult-to-approach front-facing loading zone of the packaging machine.

In some embodiments, an inventory loading system can include a frame that supports conveyor belts that allow items to be carried in a lengthwise direction along the frame. The conveyor belt can lead toward a rotary hub that has various chambers spaced around the hub's periphery. An item (or set of items) can be conveyed into one of the chambers adjacent the belt, for example, entering through an open top of the chamber that is tilted toward the belt so that the item can be pulled into the chamber at least partially under the effect of gravity.

The hub can rotate and cause the chamber to travel in an upward arc until the chamber is generally upright with the open top facing upward and an open front end facing toward the front-facing loading zone of the packaging machine. The rotation to the upright position can align the chamber with a linear actuator over the open top of the chamber. For example, a tab near the rear of the chamber may rotate into position between downward extensions of a fork connected to the linear actuator. The rear extension of the fork may thus push the rear of the tab forward to move a block-like chassis connected with the tab and move the chassis through the chamber to push the item out through the open front end of the chamber and into the front-facing loading zone of the packaging machine. To retract the chassis and prepare for a subsequent discharge action, the front extension of the fork may push the front of the tab rearward.

The upward rotation of the hub may also bring a second chamber into alignment with the conveyor belt. Thus, from a single orientation of the hub, the first chamber may be unloaded along one plane as the second chamber is being loaded along another plane.

The chamber can also include features that reduce a risk of plastic bags or other wrapping or packaging becoming tangled among surfaces that move relative one to another. For example, the sides and bottom of the chassis can be fastened to belts that extend forward of a front face of the chassis and define other sides of the chamber. When an item is received in the chamber, the chassis can be advanced to also advance the belts and thus move the item received in the chamber with all sides around it moving in synchronized movement without relative motion among the respective components. When the item has been dropped off the end of the belts by the forward motion of the belts, the chassis may continue forward past the ends of the belts in order to push the item farther in the forward direction into the receiving zone.

Referring now to the drawings, in which like names and/or reference numbers may refer to like elements across different drawings, FIG. 1 illustrates an inventory management system 101. The inventory management system 101 can include an inventory loading system 103, for example, which may facilitate loading relative to a packaging system 105 that may interact with or be included within the inventory management system 101.

FIG. 1 shows elements of the inventory management system 101 separated for ease of viewing respective elements and interaction thereof. The inventory loading system 103 may facilitate loading relative to a receiving zone 107, for example. The receiving zone 107 is shown in FIG. 1 as a zone defined by the packaging system 105. The receiving zone 107, however is not so limited, and may additionally or alternatively correspond to a receiving zone 107 of another machine or system other than that depicted.

Various elements of the inventory management system 101 may be defined in terms of different directions. For example, in FIG. 1 an altitude direction 109, a length direction 111, and a depth direction 113 are graphically represented by axes extending in respectively in the Z, X, and Y directions. In some examples, the respective directions may be orthogonal to one another. In some examples, the altitude direction 109 may correspond to an up-down direction (e.g., vertical), the length direction 111 may correspond to a left-right direction (e.g., a longitudinal direction or a first horizontal direction), and the depth direction 113 may correspond to front-back direction (e.g., a transverse direction, a lateral direction, and/or a second horizontal direction).

The packaging system 105 may correspond to a vertical packaging and/or feeding machine, e.g., which may be capable of manipulating one or more sheets of paper, plastic, and/or other packaging material to form a suitable receptacle for shipping or other transport of items. In the example depicted in FIG. 1, the packaging system 105 includes a roll 115 of packaging that can be folded or otherwise manipulated by passage through suitable members 117 to form an envelope 119 that is sealed along the top, bottom, and rear edges yet open along a front edge to define an entry opening into the receiving zone 107. The entry opening may be oriented so that the receiving zone 107 may allow insertion or be accessible through the entry opening by movement in the depth direction 113. Boundaries of the opening may be defined at least in part by a face that extends in the altitude direction 109 and/or the length direction 111.

The inventory loading system 103 may be repositionable relative to the packaging system 105. To this end, elements of the inventory loading system 103 may include or be coupled with one or more re-positioning elements 121. In FIG. 1, the re-positioning elements 121 are depicted as rails along which elements of the inventory loading system 103 may slide, although the re-positioning elements may alternatively include or be coupled with wheels, rollers, guides, or other forms of components that can provide guided or unguided motion. The re-positioning elements 121 may allow elements of the inventory loading system 103 to be moved (e.g., as depicted by arrows 123) away from the packaging system 105 (e.g., along the depth direction 113), such as to provide access to the packaging system 105 for maintenance etc.

The inventory loading system 103 can include a support frame 125 that may support other elements of the inventory loading system 103. The support frame 125 may correspond to metal, plastic, and/or other suitably robust material formed into one or more plates, bars, or other structures suitable for supporting and positioning other elements. The support frame 125 may be utilized to position other components relative to the packaging system 105. For example, other elements mounted directly or indirectly to the support frame 125 may move together as a single unit when the support frame 125 is moved by the re-positioning elements 121 relative to the packaging system 105.

The inventory loading system 103 can include a feeding system 127. The feeding system 127 can include any suitable combination of one or more inbound conveyors 129, which may each include similar or different belts, rollers, or other suitable structure for transporting contents. In some embodiments, the conveyor 129 may be supported by a base 135 relative to the support frame 125. The base 135 depicted in FIG. 1 includes a beam and a column, although any other suitable shape and/or type structure may be utilized. The column is depicted as slidable within the beam, although the base 135 may be adjustable in any suitable manner, such as to permit re-positioning (such as depicted by arrow 137) of the inbound conveyor 129 in or along the length direction 111 or other direction. For example, the inbound conveyor 129 may be re-positioned to provide access to other components or to suitably arrange the inbound conveyor 129 for receipt or delivery of contents relative to other components.

The inventory loading system 103 can also include one or more chambers 139, a rotation system 141, and a discharging system 143. Generally, in use, one of the chambers 139 can be fed with contents by the feeding system 127 (e.g., from the length direction 111), the rotation system 141 can rotate the chamber 139 into alignment with the receiving zone 107 (e.g., rotating in a curving motion that includes travel in both the altitude direction 109 and the length direction 111), and the discharging system 143 can discharge the contents from the chamber 139 in the rotated position into the receiving zone 107 (e.g., in the depth direction 113). As noted previously, the receiving zone 107 may correspond to a particular zone of the packaging system 105. Thus, although the discharging system 143 is shown separated from the receiving zone 107 by a dot-dash line for ease of viewing, in use, respective elements may be positioned adjacent one another or otherwise in suitable proximity for transition of contents from one to the other, such as depicted in FIG. 2.

Figure 2:
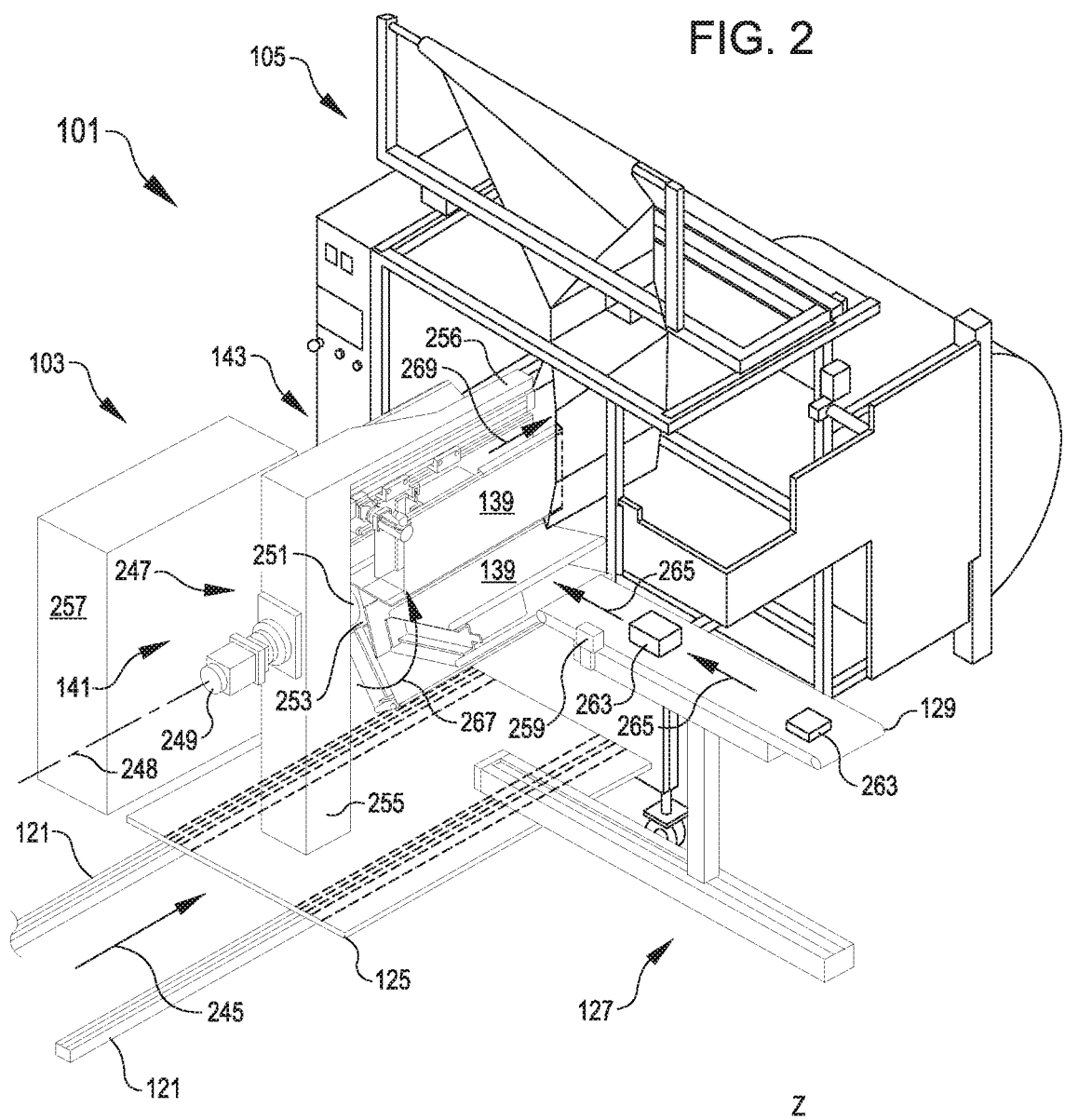
FIG. 2 is a perspective view showing the inventory management system of FIG. 1 with elements of the loading system arranged for loading relative to the packaging machine, according to various embodiments.

FIG. 2 illustrates elements of the loading system 103 arranged for loading relative to the packaging system 105. For example, the support frame 125 may be moved (e.g., as illustrated by arrow 245 toward the packaging system 105 to reach the position depicted in FIG. 2.

The rotation system 141 can include a rotary hub 247 and a rotational actuator 249. The rotary hub 247 can be rotatable about an axis 248 of rotation, which may be aligned along the depth direction 113, for example. The rotational actuator 249 can include a motor or any other suitable device for imparting rotational motion to the rotary hub 247, for example, to cause the rotary hub 247 to rotate about the axis 248 of rotation.

The rotary hub 247 can include suitable structure for supporting and/or positioning the chamber 139. For example, the rotary hub 247 can include a spindle 251 and a collar 253. The collar 253 can define an outer periphery of the rotary hub 247 along which the chamber 139 may be mounted. The collar 253 may be integrally formed with the spindle 251 or formed separately and attached. The collar 253 may extend over all or less than all of an entirety of the spindle 251.

Suitable structure may be included to support components of the rotation system 141 and/or other associated components. For example, the support frame 125 can include or be coupled with a stand 255. The stand 255 can support the rotational actuator 249 and the spindle 251 or otherwise support the rotary hub 247. For example, the stand 255 depicted in FIG. 2 is penetrated by at least one of the rotational actuator 249 or the spindle 251, although other arrangements can be used with belts or other structures for mechanically coupling elements of the rotation system 141 together or otherwise permitting suitable rotation. The stand 255 depicted in FIG. 2 also includes an arm 256 that can support components of the discharging system 143, as described further below. The support frame 125 can also include or be coupled with a housing 257, for example, which may contain control elements for the loading system 103.

The feeding system 127 may include or be associated with a sensor 259. The sensor 259 may be an optical sensor or any other sensor capable of detecting locations of items 263 relative to the inbound conveyor 129. For example, the sensor 259 may provide information about when a forward or rear edge of the item 263 has passed the sensor 259 or may otherwise provide information about when an item 259 has been fed into the chamber 139. In some examples, the inbound conveyor 129 may be controlled to index forward to move each successive item 263 based on location information from the sensor 259. For example, the inbound conveyor 129 may be activated to advance items 263 toward and/or into the chamber 139 and deactivated, slowed, or paused upon detection by the sensor 259 of the items 263 having reached the chamber 139.

The items 263 may be goods or inventory stored in a warehouse environment and purchasable by a purchaser. In various embodiments, the items 263 may be ordered by a purchaser through an online portal. For example, the items 263 may be or include a plastic action figure, a dog toy, or a watch purchased through the online portal. The item 263 can be retrieved from the warehouse environment, transported to and/or by the inventory loading system 103, and deposited into the packaging system 105 so that a package can be completed and sent (or otherwise transported) to the purchaser for delivery of the item in fulfillment of the purchase.

The feeding system 127 may be supplied with items 263 by any suitable source. In some embodiments, robotic manipulators may be utilized to place items 263 on the inbound conveyor 129 and/or directly into a chamber 139. In some embodiments, a robotic manipulator may be able to perform loading actions more quickly and/or reliably relative to the inbound conveyor 129 than relative to the chambers 139 and/or receiving zone 107, and thus increased or improved throughput may be obtained by augmenting the robotic manipulator with other structures described. In some embodiments, the inbound conveyor 129 may be supplied by other conveyors and/or other suitable inbound structures along with or instead of the robotic manipulators. The order of items 263 supplied to the feeding system 127 may be predetermined or otherwise known or determined and may facilitate control of actions of the inventory management system 101 for suitably processing items 263 in appropriate batches for fulfilling orders.

In operation, the loading system 103 can be utilized for loading suitable sets of one or more items 263 relative to the receiving zone 107. For example, one or more items 263 may be fed by the feeding system 127 toward (e.g., as illustrated by arrow 265) and into (e.g., as illustrated by arrow 266) the chamber 139. The rotation system 141 may rotate (e.g., as illustrated by arrows 267) the chamber 139 carrying the items 263. With the chamber 139 so rotated, the discharging system 143 can act on the items 263 to impart movement (e.g., as illustrated by arrows 269) toward the packaging system 105 or other receiving zone 107.

Figure 3:
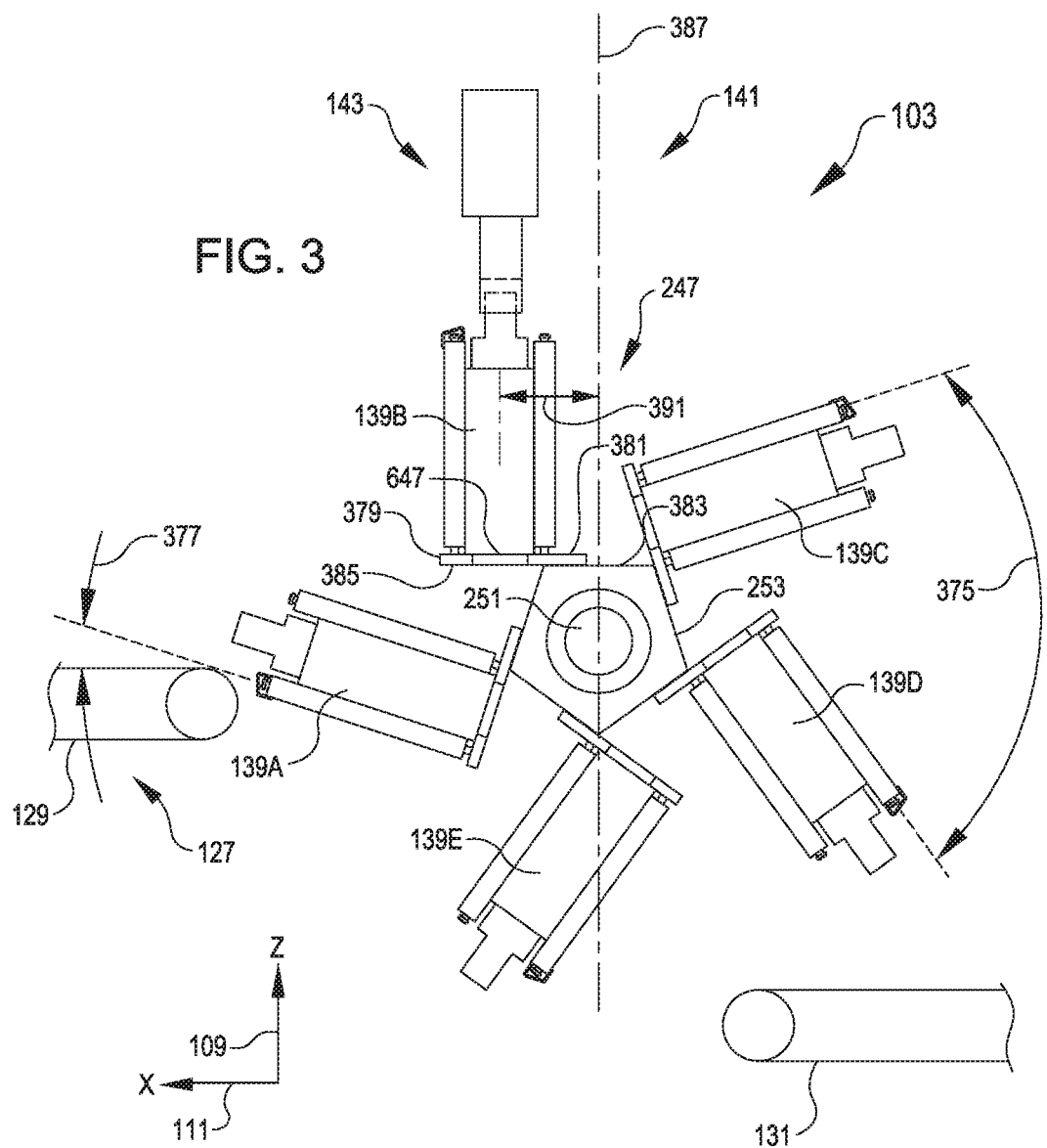
FIG. 3 illustrates an end view of some of the components of the loading system of FIGS. 1 and 2, according to various embodiments.

FIG. 3 illustrates an end view of some of the components of the loading system 103. Although the view in FIG. 3 shows five total chambers 139 (individually identified with suffixes as chambers 139A, 139B, 139C, 139D, and 139E), any suitable number of one or more chambers 139 may be utilized. Adjacent chambers 139 may be spaced apart from one another by an interval angle 347 about the periphery of the rotary hub 247. The chambers 139 may be equally spaced about the periphery of the rotary hub 247, e.g., such that the interval angle 375 is equal to 360° divided by the number of chambers 139. For example, for the five chambers in FIG. 3, the interval angle may be 72°.

In a loading position (e.g., as occupied by chamber 139A in FIG. 3), the chamber 139A can be arranged to form an alignment angle 377 relative to the inbound conveyor 129 or other portion of the feeding system 127. The alignment angle 377 may represent an amount of deviation from a horizontal reference line and/or from an upper surface of the inbound conveyor 129 or other portion of the feeding system 127. The alignment angle 377 may depend at least in part on a number of chambers 139 utilized. For example, the alignment angle 377 may be equal to 90° minus the interval angle 375. As an illustrative example, for the five chambers utilized in the arrangement depicted in FIG. 3, a calculation of 90° minus 72° of the interval angle 375 may yield a corresponding alignment angle 337 of 18°.

In some embodiments, it may be advantageous to utilize at least five chambers 139. For example, use of at least five chambers 139 may yield an alignment angle 337 that will dispose an adjacent chamber 139A in a downward orientation from the feeding system 127. Such a downward orientation may be useful to allow gravity to at least partially assist in drawing an item 263 into the chamber 139A from the feeding system 127. In some embodiments, increasing the number of chambers 139 beyond five may facilitate increasing the alignment angle 337 and accordingly increase an amount of gravity assistance that may be obtained. In some embodiments, an alignment angle 377 that yields a downward orientation may be obtained with fewer than five chambers 139. As an illustrative example, an arrangement could include three chambers 139 tilted from extensions of the collar 253 to obtain an alignment angle 377 that would provide a corresponding downward orientation. In some embodiments, chambers 139 may be utilized without a downward orientation. For example, an arrangement of four chambers 139 may be utilized to obtain an alignment angle 377 of 0° yet still function to receive and retain items 263 when rotated by the rotation system 141.

A boom 379 may be utilized to support the chamber 139 relative to the collar 253. The boom 379 may be sized, shaped, and arranged for an anchor portion 381 to be mounted to a mounting surface 383 of the collar 253 and for cantilevered portion 385 to extend away from the collar 253. The cantilevered portion 385 of the boom 379 may define a structure that can facilitate movement on an underside for other elements, such as the bottom conveying surface 647 described later herein with respect to FIG. 6.

The chamber 139 can be arranged offset from a radial axis 387 of the rotary hub 247. For example, the radial axis 387 may extend in a radial direction outward from the axis 248 of rotation of the rotary hub 247. The chamber 139 may have a center that is spaced apart by an offset 391 from the radial axis 387, for example. A magnitude of the offset 391 may be at least partially determined by a size of the boom 379, such as a length of the cantilevered portion 385.

The rotary hub 247 may be capable of rotating chambers 139 into different positions represented by the different chambers 139 depicted in FIG. 3. For example, a first position may be represented by the first chamber 139A in FIG. 3. The first position may correspond to a loading position that may facilitate loading of the chamber 139A from the feeding system 127, such as through an open top of the chamber 139A. For example, the first position may be a recumbent position of the chamber 139A.

A second position may be represented by the second chamber 139B in FIG. 3. The second position may correspond to a discharging position that may facilitate discharging of contents of the chamber 139B by the discharging system 143, such as through an open end or output face of the chamber 139A (which may be perpendicular to, non-parallel to, and/or otherwise different and/or distinct from the open top or input face through which the item 263 was initially loaded). In some examples, the second position may be an upright position of the chamber 139B.

A third position may be represented by the third chamber 139C in FIG. 3. The third position may correspond to an intermediate position that the chamber 139C may traverse in moving between other positions.

A fourth position may be represented by the fourth chamber 139D in FIG. 3. The fourth position may correspond to an emptying position that may facilitate emptying of contents of the chamber 139D under the effect of gravity, such as through the same open top through which the item 263 was loaded, rather than through the open end for discharging. An emptying position may be useful to allow an item 263 to be routed without engagement by the discharging system 143. In some examples, the emptying position may be accompanied by an output conveyor 131 or other suitable structure for receiving an emptied item 263.

A fifth position may be represented by the fifth chamber 139E in FIG. 3. The fifth position may correspond to ready position that the chamber 139C may occupy in preparation for moving back into the first position, for example.

The rotary hub 247 may be capable of rotating between different orientations. The different orientations may arrange chambers 139 in different positions. For example, in a first orientation, a first chamber 139A may be arranged in a loading position, such as that occupied by the chamber 139A in FIG. 3. Meanwhile, in the first orientation, a second chamber 139E may also be arranged in a ready position, such as that occupied by the chamber 139E in FIG. 3.

When the rotary hub 247 has rotated to a second orientation, the first chamber 139A may instead be in a second position (such as that previously occupied by the chamber 139B in FIG. 3), while the second chamber 139E may instead be in the first position (such as that previously occupied by the chamber 139A in FIG. 3). Thus, in various orientations, multiple chambers 139 may be in positions that facilitate respective movement of items 263 relative to the chambers 139. For example, in the second orientation, items 263 may be fed into the second chamber 139 and discharged from the first chamber 139 simultaneously or otherwise prior to rotation of the rotary hub 247 to a new orientation. With a single orientation thus providing an opportunity to perform a plurality of synchronized actions of moving items 263, high through-puts can be achieved.

Numerous variations may be implemented. For example, although FIG. 3 depicts an arrangement with the feeding system 127 on one side (e.g., on the left side of the radial axis 387 in FIG. 3), the feeding system 127 may include structure additionally or alternatively arranged on an opposite side (e.g., on the right side of the radial axis 387 in FIG. 3, such as at an upwardly adjusted height suitable for loading into the third chamber 139C). In some embodiments, the feeding system 127 may be capable of feeding from both left and right directions in FIG. 3 or otherwise capable of feeding from multiple directions, for example, which may facilitate capacity to load relative to the hub 247 regardless of the direction of rotation of the hub 247 (e.g., whether clockwise or counterclockwise relative to FIG. 3). In some embodiments, the rotary hub 247 may be capable of reversing direction of rotation and/or capable of oscillating among rotation directions. In some embodiments, the chambers 139 may be suitably arranged on the rotary hub 247 (e.g., arranged at a suitable interval angle 375) to enable an oscillating or incremental rotation that will move one loaded chamber 139 to a discharging position while still maintaining contents within a second loaded chamber 139 (e.g., without rotating the second loaded chamber 139 so far as to cause contents to fall out under the effect of gravity). For example, a leftward chamber 139 loaded from the left of the view in FIG. 3 may be rotated toward the center of the view in FIG. 3 without imparting enough rotation to dump contents of a rightward chamber 139 instead loaded from the right of the view in FIG. 3. In some embodiments, an oscillating movement of the rotary hub 247 may allow a pair of chambers 139 to be efficiently used, for example, such that a leftward incremental rotation allows a leftward chamber 139 to be loaded while a rightward chamber 139 is discharged and such that a rightward incremental rotation allows the leftward chamber 139 to be discharged while the rightward chamber 139 is loaded. Moreover, although the feeding system 127 and the output conveyor 131 are depicted in FIG. 3 on opposite sides and conveying in a similar direction (e.g., respectively on the left and right sides of the radial axis 387 and each conveying in a generally rightward direction in FIG. 3), other arrangements or combinations may be utilized (e.g., including, but not limited to arrangements in which either or both of the feeding system 127 and the output conveyor 131 include components on multiple sides of the rotary hub 247 and/or in which the output conveyor 131 conveys underneath, backwards, or otherwise in a direction different from a conveyance direction of the feeding system 127).

Figure 4:
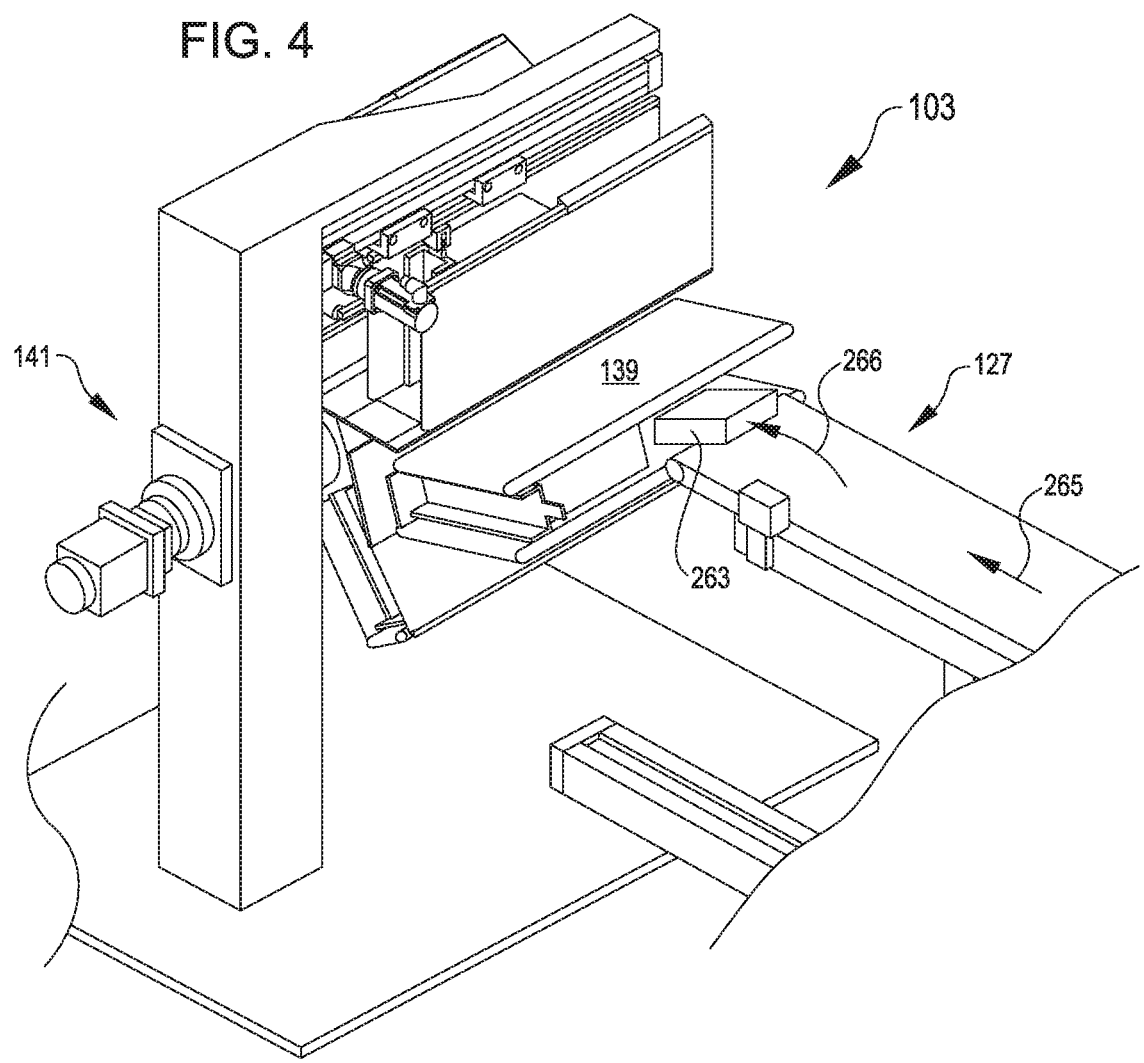
FIG. 4 illustrates a perspective view of various elements of the loading system of FIGS. 1 through 3 with one chamber in position to receive an item from a feeding system, according to various embodiments.

FIG. 4 illustrates elements of the loading system 103 with one chamber 139 in position to receive an item 263 from the feeding system 127. The item 263 may be moved by the inbound conveyor 129 toward and into the chamber 139 (e.g., as respectively shown by arrows 265 and 266). Upon receipt of the item 263, the chamber 139 may be ready for a rotational movement by the rotation system 141, such as that referenced with respect to FIG. 5.

Figure 5:
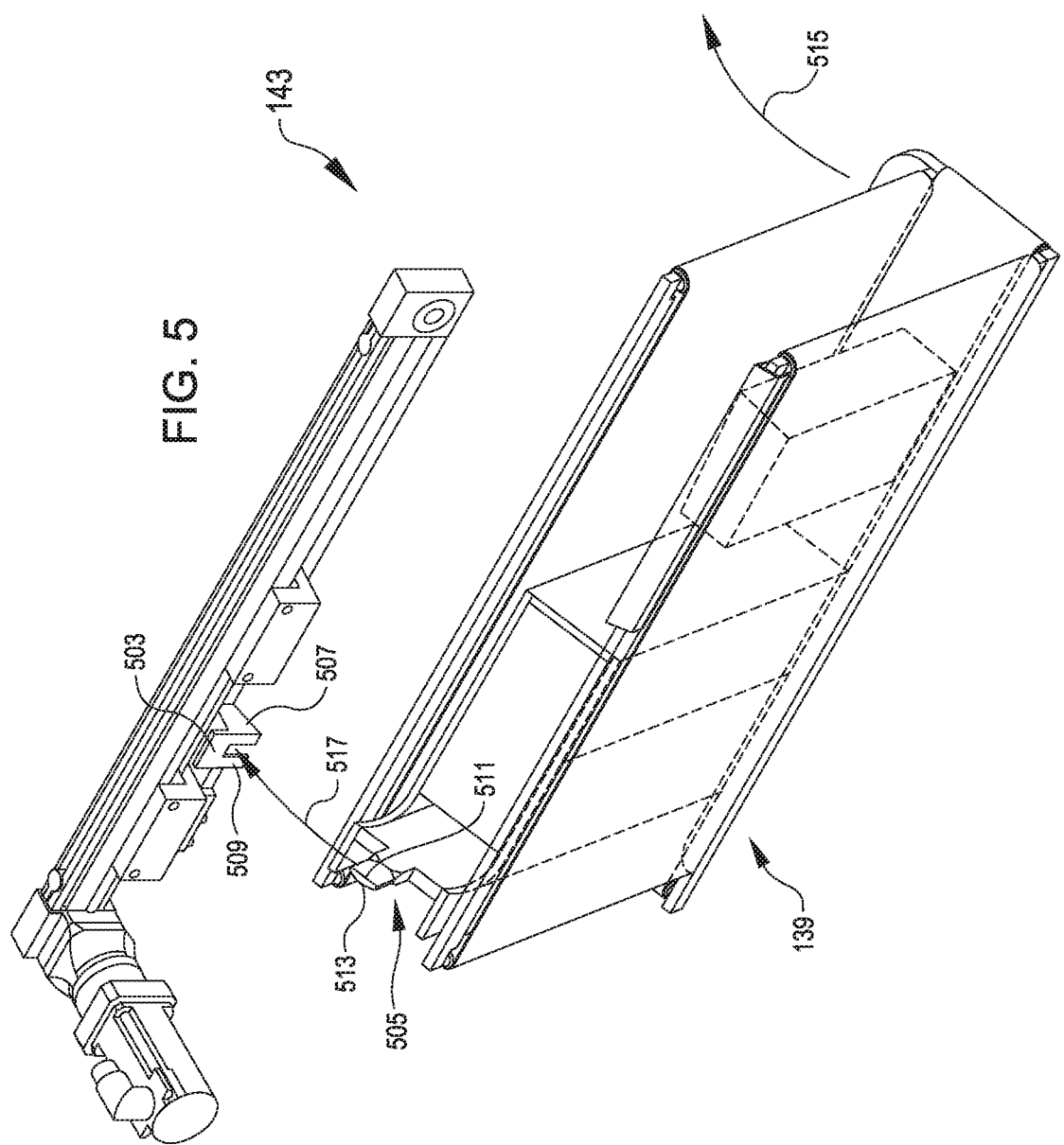
FIG. 5 illustrates a perspective view of various elements of the loading system of FIGS. 1 through 4 with a chamber aligned for rotation relative to elements of a discharging system, according to various embodiments.

FIG. 5 illustrates the chamber 139 aligned for rotation relative to elements of the discharging system 143. A fork 503 and a tab 505 or any other suitable selective engagement features can be included to facilitate operation of the discharging system 143. Although the arrangement in FIG. 5 is depicted with the tab 505 being supported by and extending from structure of the chamber 139 while the fork 503 is supported by and extending from separate receiving structure, the elements could be reversed so that the fork 503 is instead supported by and extending from structure of the chamber 139 while the tab 505 is supported by and extending from the separate receiving structure.

The fork 503 can include a front fork extension 507 and a rear fork extension 509. The tab 505 can include a front tab face 611 and a rear tab face 613. As the chamber 139 is rotated (e.g., as depicted by arrow 615), the tab 505 can be received (e.g., as depicted by arrow 617) within the fork 503. Receipt of the tab 505 by the fork 503 can dispose the front fork extension 507 in facing relationship with the front tab face 511 and can dispose the rear fork extension 509 in facing relationship with the rear tab face 513, such as in the position depicted in FIG. 6.

Figure 6:
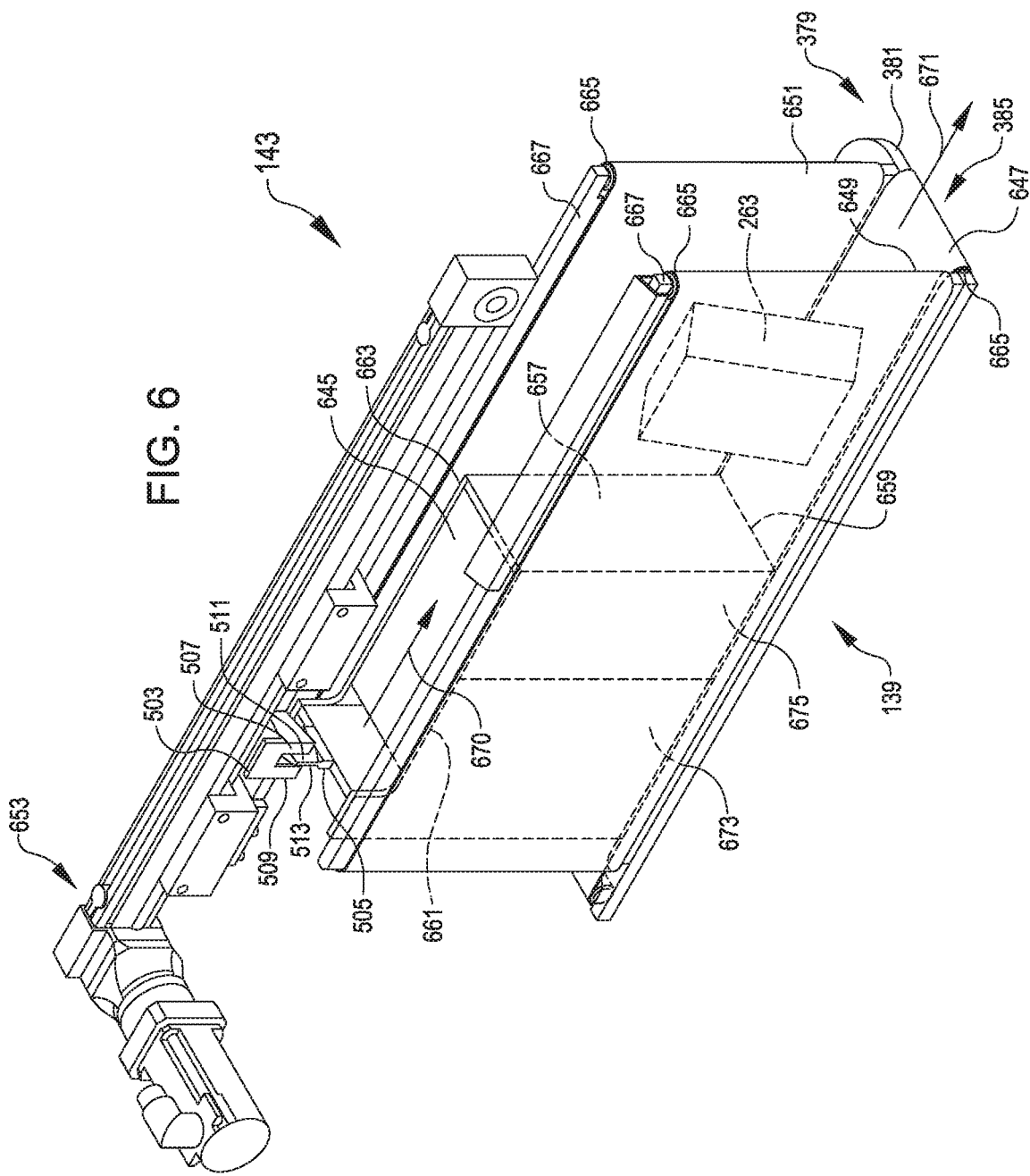
FIG. 6 illustrates a perspective view of various elements of the loading system of FIGS. 1 through 5 with a chamber engaged for discharge of contents by the discharging system, according to various embodiments.
Figure 7:
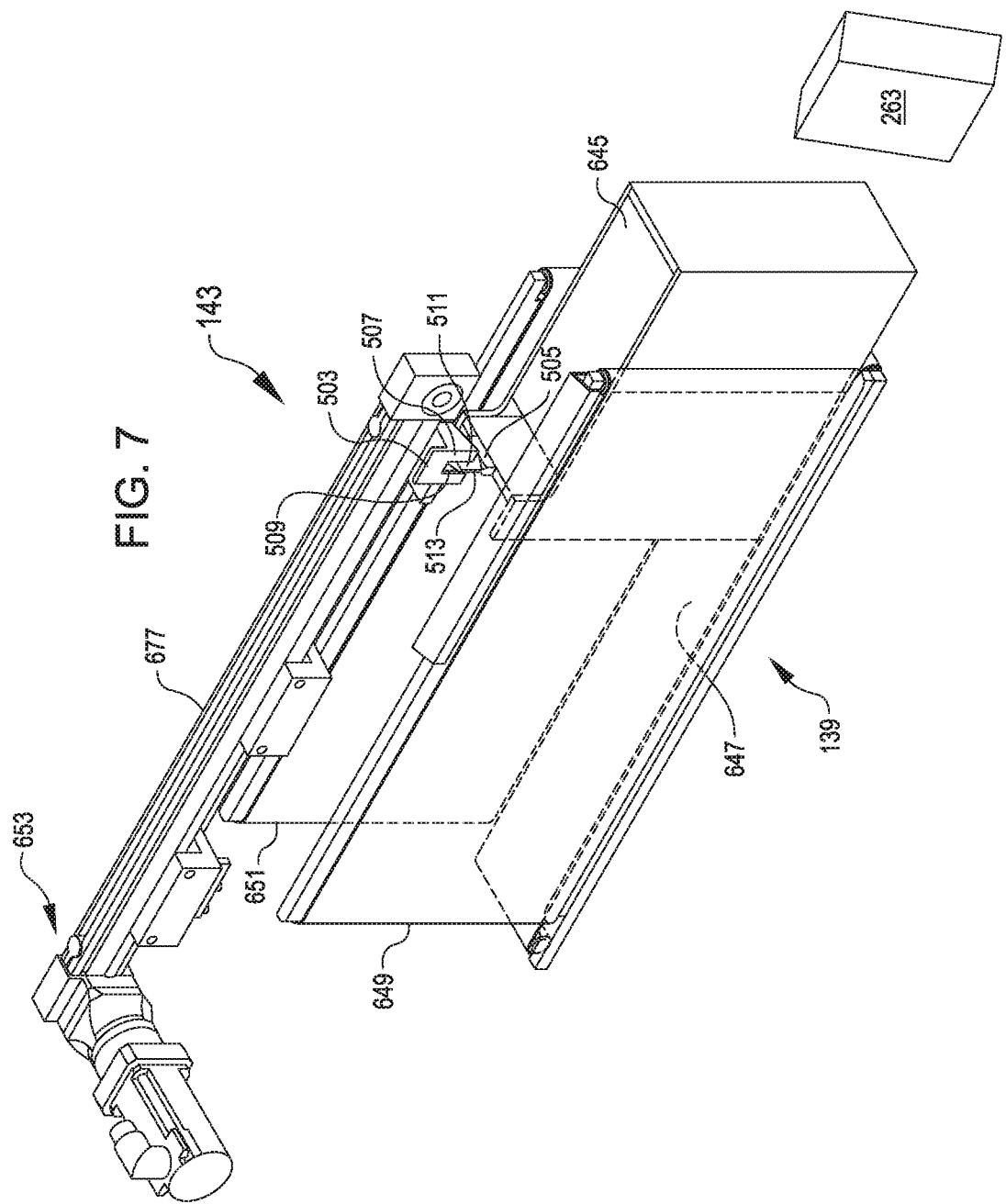
FIG. 7 illustrates a perspective view of various elements of the loading system of FIGS. 1 through 6 with the chamber after contents have been moved out by the discharging system, according to various embodiments.

FIGS. 6-7 show different states of elements of the discharging system 143, according to various embodiments. FIG. 6 illustrates the chamber 139 engaged for discharge of contents by the discharging system 143, and FIG. 7 illustrates the chamber 139 after contents have been moved out by the discharging system 643. Although the chamber 139 in FIG. 5-7 is shown containing a single item 263, in some embodiments, the chamber 139 may be additionally or alternatively utilized to contain or carry multiple items 263. For example, the chamber 139 may receive multiple items 263 from the feeding system 127 before being rotated by the rotation system 141.

The discharging system 643 depicted in FIG. 6 includes a chassis 645, a bottom conveying surface 647, a first side conveying surface 649, a second side conveying surface 651, and a linear actuator 653. Respective conveying surfaces may correspond to belts, bands, or any other form of surface by which conveying can be performed.

One or more elements of the discharging system 643 may be supported by the arm 256 and/or other portion of the support frame 125, for example. The discharging system 643 also includes or is coupled with the chamber 139, which may be at least partially defined by other components of the discharging system 643. Generally, the linear actuator 653 may drive the chassis 645 between a home position (e.g., as shown in FIG. 6) and toward an extended position (e.g., as shown in FIG. 7). In some embodiments, in the extended position, at least a portion of the chassis 645 may extend beyond a forward end of the chamber 139.

The linear actuator 653 may correspond to any suitable structure or combination of structure capable of causing linear actuation of the chassis 645. For example, although the linear actuator 653 in FIG. 6 is depicted as including a motor capable of conveying a carriage along a rail, other suitable structures for the linear actuator 653 may include a pneumatic cylinder, a hydraulic cylinder, a solenoid, driven rollers, gears, chains, or other devices capable of imparting linear motion of the chassis 645. As one particular example, in some embodiments, the linear actuator 653 may take the form of a driven shaft that drives a roller 665 that in turn drives a conveying surface coupled with the chassis 645. Such a driven shaft may remain engaged with the roller 665 or may use a gear, telescoping rod, or other structure capable of selective engagement with the roller 665 when a corresponding chamber 139 is rotated or otherwise suitably moved into position. Moreover, although the linear actuator 653 is depicted in FIG. 6 in an arrangement that may facilitate a one-to-many ratio (e.g., with a single linear actuator 653 that may be respectively used with each of multiple chambers 139 that may be rotated into place for discharging from a single position), in some embodiments, each chamber 139 may include or be coupled with its own designated linear actuator 653 or the linear actuator 653 may be otherwise subject to a one-to-one or many-to-many ratio or other arrangement which may allow multiple discharge paths relative to the rotary hub 247.

Various elements of the discharging system 143 may be fastened together. Fastening together may allow relative movement among elements to be minimized. Additionally or alternatively, fastening together may cause elements to move in unison and prevent relative movement among elements that might otherwise be prone to capturing wrapping plastic or other loose parts of items 263 that may be received in the chamber 139.

Referring again to FIG. 6, the chassis 645 may include at least a front face 657, a bottom face 659, a first lateral face 661, and a second lateral face 663. The bottom face 659 of the chassis 645 may be fastened to the bottom conveying surface 647. The first lateral face 661 of the chassis 645 can be coupled to the first side conveying surface 649, while the second lateral face 663 of the chassis 645 can be coupled to the second side conveying surface 651. The fastening may be accomplished by mechanical fasteners, adhesives, or any other bonding or fastening technique. Fastening may allow movement of the chassis 645 to cause or impart movement in other elements fastened thereto. This may allow the linear actuator 653 to move the chassis 645 to impart synchronized movement of the first side conveying surface 649, the second side conveying surface 651, and the bottom conveying surface 647, for example.

In some embodiments, additional structure may be utilized to facilitate movement of constituent elements. For example, rollers 665 may be provided as a surface about which a respective conveying surface (such as the bottom conveying surface 647, first side conveying surface 649, or second side conveying surface 651) may turn or be looped. Guide plates 667 may be included to provide structural guides along which respective conveying surfaces may be moved and/or received. The boom 379 may be an example of a guide plate 667. For example, the cantilevered portion 385 may provide an unobstructed region away from the collar 253 in which the bottom conveying surface 647 can travel, such as running along an underside of the cantilevered portion 385.

The chamber 139 may be bounded or defined in some part with respect to other elements of the discharging system 643. For example, the chamber 139 at a rear end or rear wall may be defined at least in part by the front face 657 of the chassis 645. The chamber 139 may be bounded on a bottom and sides respectively by the bottom conveying surface 647, the first side conveying surface 649, and the second side conveying surface 651. A front of the chamber 139 may correspond to a location of rollers 665 or a front end of one or more of the bottom conveying surface 647, the first side conveying surface 649, or the second side conveying surface 651 (e.g., where such conveying surfaces may turn and be looped around the rollers 665). The top of the chamber 139 may be open, which may facilitate the receipt of one or more items 263, such as from the feeding system 127 along the length direction 111. The front of the chamber 139 may be open as well, which may facilitate discharge of the one or more items 263, such as under operation of the discharging system 143 to move the item in the depth direction 113.

In operation, the linear actuator 653 may be utilized to move the elements that bound the chamber 139 and advance the item 263 in unison with movement of the chamber 139. For example, the rear tab face 513 may be pushed by the rear fork extension 509 in response to movement of the linear actuator 653 and impart forward motion to the chassis 645 (such as illustrated by arrow 670). Forward motion of the chassis 645 may impart forward motion of the item 263 to cause the item 263 to be ejected from the chamber 139 (such as illustrated by arrow 671).

The chamber 139 may shrink or reduce in size in response to movement of the linear actuator 653. For example, the size the available interior volume of the chamber 139 in FIG. 6 is much greater than that shown in FIG. 7, where the chassis 645 has been advanced by the linear actuator 653 to a position of effectively eliminating the available interior volume of the chamber 139. Movement of the chamber 139 and/or reduction inside of the chamber 139 may cause the item 263 to be transported toward and/or into a receiving zone 107.

With reference to FIG. 7, for example, in some embodiments, the chassis 645 can be advanced (e.g., at the end of a stroke) by the linear actuator 653 to extend past a front edge of the chamber 139. The chassis 645 extending past the front end of the chamber 139 may allow the chassis 645 to push an item 263 fully out of the chamber and into the receiving zone 107, such as by pushing the item further into the receiving zone 107 than if merely dropped off an end of the bottom conveying surface 647.

In some embodiments, to facilitate the chassis 645 extending past the front end of the chamber 139, the chassis 645 may be subject to a particular fastening arrangement. For example, with reference to FIG. 6, the chassis 645 in its forward-backward or depth direction may include a rearward portion 673 and a forward portion 675. The bottom conveying surface 647, the first side conveying surface 649, and the second side conveying surface 651 may be fastened to the chassis 645 in the rearward portion 673 without being fastened to the chassis 645 in the forward portion 675. The chassis 645 being fastened in the rearward portion 673 without being fastened in the forward portion 675 may allow the forward portion 675 to be moved by the linear actuator 653 to a position of extending forward past ends of bottom conveying surface 647, the first side conveying surface 649, and the second side conveying surface 651, for example, to the position shown in FIG. 7.

Upon loading or discharging item 263 into the receiving zone 107, the chassis 645 may be translated anew away from the extended position and back toward the home position to reset the chamber 139 for receipt of subsequent items 263. For example, referring to FIG. 7, the front tab face 511 may be pushed by the front fork extension 507 in response to movement of the linear actuator 653 and impart rearward motion to the chassis 645 (such as opposite the motion illustrated by arrow 670 in FIG. 6), e.g., which may return the chassis 645 from the position shown in FIG. 7 to that shown in FIG. 6.

In some embodiments, the linear actuator 653 may be positioned directly overhead of the chassis 645. For example, in the figures, a rail 677 or other portion of the linear actuator 653 is depicted positioned laterally over the chassis 645 once the chamber 139 is rotated into a discharging position. (e.g., with the linear actuator 653 positioned in a vertical projection of a space bounded by the first side conveying surface 649 and the second side conveying surface 651). Positioning the linear actuator 653 overhead of the chassis 645 may allow the linear actuator 653 to be used for multiple chambers 139 (e.g., via engagement of tabs 505 and forks 503), may allow for at least partially covering an open top that was previously utilized to load the chamber 139 prior to rotation, and/or may allow a compact usage of space that may occupy less space than if the linear actuator 653 were instead positioned to a side of the chassis 645.

Suitable examples of elements for the discharging system 143 have been described in detail herein, such as with respect to FIGS. 6-7, the discharging system 143 may additionally or alternatively utilize any suitable pusher, puller, or other structure to transition contents of the chamber 139 into the receiving zone 107 in the depth direction 113.

Figure 8:
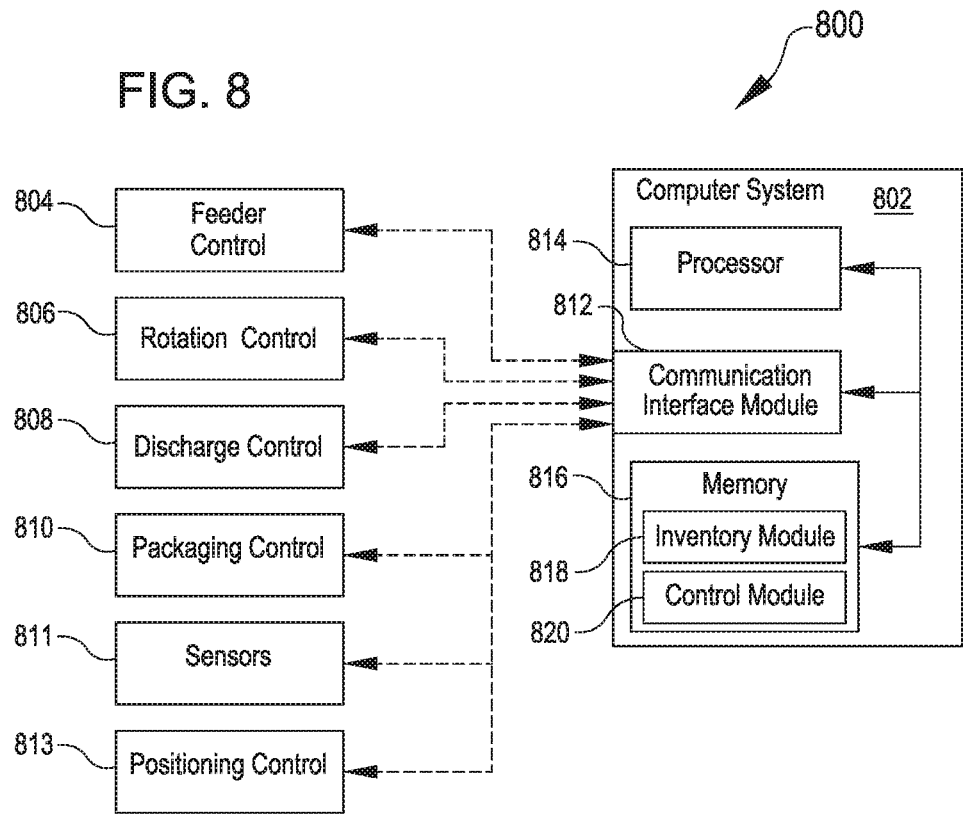
FIG. 8 is a block diagram illustrating examples of control aspects of the inventory management system of FIGS. 1 through 7, according certain embodiments.

FIG. 8 is a block diagram illustrating control aspects of an inventory management system 800 according certain embodiments. The inventory management system 800 may be an example of the inventory management system 101, described elsewhere herein. As shown in FIG. 8, the inventory management system 800 includes a computer system 802, a feeder control 804, a rotation control 806, a discharge control 808, a packaging control 810, sensors 811, and positioning control 1313. In general, the computer system 802 may function as a controller that controls other components of the inventory management system 800, for example, as described further below.

The feeder control 804 may correspond to elements capable of adjusting operating parameters of the feeding system 127. Non-limiting examples may include motors, actuators, or other elements capable of controlling the inbound conveyor 129, the output conveyor 131, and/or the base 135.

The rotation control 806 may correspond to elements capable of adjusting operating parameters of the rotation system 141. Non-limiting examples may include motors, actuators, or other elements capable of controlling the rotary hub 247, the rotational actuator 249, the spindle 251, the collar 253, the stand 255, and/or the arm 256.

The discharge control 808 may correspond to elements capable of adjusting operating parameters of the discharging system 143. Non-limiting examples may include motors, actuators, or other elements capable of controlling the linear actuator 653, the rollers 665, the chassis 645, the bottom conveying surface 647, the first side conveying surface 649, and/or the second side conveying surface 651.

The packaging control 810 may correspond to elements capable of adjusting operating parameters of the packaging system 105. Non-limiting examples may include motors, actuators, or other elements capable of controlling the roll 115, members 117, and/or envelope 119.

The sensors 811 may include optical sensors, pressure sensors, or any other sensors that may obtain information about items or other elements of the inventory management system 101, which may include information about position, alignment, speed, or any other conditions or state information about components of the inventory management system 101. For example, the sensor 259 may be included in the sensors 811.

The positioning control 813 may correspond to elements capable of adjusting operating parameters pertaining to positioning. Non-limiting examples may include motors, actuators, or other elements capable of controlling the re-positioning elements 121, the support frame 125, the base 135, the stand 255, and/or the arm 256. The feeder control 804, the rotation control 806, the discharge control 808, the packaging control 810, the sensors 811, and/or the positioning control 813 may function as appropriate inputs and/or outputs for control of the inventory management system 800 by the computer system 802.

The illustrated computer system 802 includes a communication interface module 812, a processor 814, a memory 816, an inventory module 818, and a control module 820. The computer system 802 may represent a single component, multiple components located at a central location within the inventory management system 800, or multiple components distributed throughout the inventory management system 800. In general, computer system 802 may include any appropriate combination of hardware and/or software suitable to provide the described functionality.

Processor 814 is operable to execute instructions associated with the functionality provided by computer system

802. Processor 814 may comprise one or more general purpose computers, dedicated microprocessors, or other processing devices capable of communicating electronic information. Examples of processor 814 include one or more application-specific integrated circuits (ASICs), field programmable gate arrays (FPGAs), digital signal processors (DSPs) and any other suitable specific or general purpose processors.

Memory 816 stores processor instructions, inventory requests, state information for the various components of inventory management system 800 and/or any other appropriate values, parameters, or information utilized by computer system 802 during operation. Memory 816 may represent any collection and arrangement of volatile or nonvolatile, local or remote devices suitable for storing data. Examples of memory 816 include, but are not limited to, random access memory (RAM) devices, read only memory (ROM) devices, magnetic storage devices, optical storage devices or any other suitable data storage devices.

Communication interface module 812 facilitates communication between computer system 802 and other components of inventory management system 800, including information and/or instructions conveyed between any of the feeder control 804, the rotation control 806, the discharge control 808, the packaging control 810, the sensors 811, the positioning control 813, the inventory module 818, and/or the control module 820. These communications may represent communication of any form appropriate based on the capabilities of computer system 802 and may include any suitable information. Depending on the configuration of computer system 802, communication interface module 812 may be responsible for facilitating either or both of wired and wireless communication between computer system 802 and the various components of inventory management system 800. In particular embodiments, computer system 802 may communicate using communication protocols such as 802.11, Bluetooth, or Infrared Data Association (IrDA) standards.

In general, the inventory module 818, the control module 820, and the communication interface module 812 may each represent any appropriate hardware and/or software suitable to provide the described functionality. In addition, as noted above, computer system 802 may, in particular embodiments, represent multiple different discrete components and any or all of the inventory module 818, the control module 820, and the communication interface module 812 may represent components physically separate from the remaining elements of computer system 802. Moreover, any two or more of the inventory module 818, the control module 820, and the communication interface module 812 may share common components. For example, in particular embodiments, the inventory module 818 and the control module 820 represent computer processes executing on processor 814 and communication interface module 812 comprises a wireless transmitter, a wireless receiver, and a related computer process executing on processor 814.

The inventory module 818 may determine conditions present in the inventory management system 800, track inventory requests, and/or determine objectives for the inventory management system 800. For example, the inventory module 818 may determine (e.g., based on an optical sensor) which items 263 are being supplied by the feeding system 127, rotated within the chamber 139, discharged into the receiving zone 107, and/or emptied onto the output conveyor 131. The inventory module 818 may also determine targets (e.g., a target item being supplied, a target chamber for receiving an item, or a target station or receptacle designated to receive a target item from a target chamber). The inventory module 818 may also determine the state of other elements within the inventory management system 800, such as a speed or orientation of a particular element within or utilized by the feeder control 804, the rotation control 806, the discharge control 808, the packaging control 810, the sensors 811, and/or the positioning control 813.

The control module 820 may control components within the inventory management system 800. For example, the control module 820 may send commands to the feeder control 804, the rotation control 806, the discharge control 808, the packaging control 810, the sensors 811, and/or the positioning control 813 to control respective components of the inventory management system 800. In various embodiments, the control module 820 may control components based on information provided by the inventory module 818. For example, based on designated targets and relative location of those targets identified by the inventory module 818, the control module 820 may activate respective components to cause an item to be routed and transferred or otherwise operated upon by constituent elements of the feeder control 804, the rotation control 806, the discharge control 808, the packaging control 810, the sensors 811 and/or the positioning control 813. The control module 820 may implement other changes based on the inventory module 818 determining other actions may be warranted to move other elements to suitable locations (such as adjusting a speed, orientation, or other state of elements of the inventory management system 800 to achieve a particular goal). Illustrative examples may be appreciated with respect to FIG. 9, for example.

FIG. 9 illustrates a process 900 that may be performed by elements of the inventory management system 1300. Some or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At act 905, the process 900 may include orienting a rotary hub in a first orientation. This may correspond to the rotary hub 247 arranging a first chamber 139 in a recumbent position, a loading position, and/or other first position aligned for receiving an item 263. For example, the control module 820 may control the rotational actuator 249 to turn the spindle 251, the collar 253, and/or otherwise cause rotation to provide a suitable initial alignment for the chamber 139.

At act 910, the process 900 may include feeding an item or first set of items into a first chamber. This may correspond to the item 263 being supplied by the feeding system 127 and/or by the inbound conveyor 129. For example, the control module 820 may control the inbound conveyor 129, the feeding system 127, and/or the base 135 to cause movement to load the item 263 into the chamber 139.

At act 915, the process 900 can include orienting the rotary hub in a second orientation. This may correspond to the rotary hub 247 arranging the first chamber 139 in an upright position, a discharging position, and/or other second position aligned for discharging an item 263. For example, the control module 820 may control the rotational actuator 249 to turn the spindle 251, the collar 253, and/or otherwise cause rotation to provide a suitable second alignment for the rotary hub 247. In the second orientation, a second chamber 139 may also be positioned in the recumbent position, loading position, and/or other first position aligned for receiving an item 263, for example, such that multiple item-moving actions can be performed relative to a single orientation of the hub 247. Rotating to orient in the second orientation may also rotate the tab 505 to into alignment and/or engagement with the fork 503 to facilitate discharging actions.

At act 920, the process 900 can include translating a chassis. For example, this may correspond to the control module 820 controlling the linear actuator 653 to move the chassis 645 relative to the support frame 125 and/or the chamber 655. Translation of the chassis 645 may cause other elements to move in unison with the chassis 645.

At act 925, the process 900 may include advancing conveying surfaces. The conveying surfaces may correspond to boundaries of the chamber 655. The advancing at act 925, for example, may be a result of the bottom conveying surface 647, the first side conveying surface 649, and the second side conveying surface 651 attached with the chassis 645 moving in unison with the chassis 645 or having motion imparted by movement of the chassis 645.

At act 930, the process 900 can include discharging the first item set from the first chamber. For example, this can include the item 263 being moved out of the chamber 655 and into a receiving zone 107. For example, the control module 820 may control the linear actuator 653, the bottom conveying surface, 647, the first side conveying surface 649, the second side conveying surface 651, and/or the rollers to push the item 263 out of the chamber 139 and into the receiving zone 107. Movement out of the chamber 655 may be caused by movement and/or shrinking of the chamber 655 in response to the translation of the chassis 645 at act 920 and/or advancing of the chamber 655 and/or conveying surfaces at 925.

In some embodiments, discharging the item 263 from the chamber 655 at act 930 can include the chassis 645 moving or extending beyond a front end 669 of the chamber 655. For example, such movement or extension may push the item 263 into the receiving zone 107. Such movement or extension may be in response to the linear actuator 653 being controlled by the control module 820, for example.

At act 935, the process 900 may include feeding an item or second set of items into the second chamber. This may correspond to the item 263 being supplied by the feeding system 127 and/or by the inbound conveyor 129 into the second chamber. For example, the control module 820 may control the inbound conveyor 129, the feeding system 127, and/or the base 135 to cause movement to load the item 263 into the chamber 139. The feeding of the second chamber at act 935 may occur substantially simultaneously with the discharging of the first chamber at act 930.

At act 940, the process 900 may include re-setting the discharging system. For example, this may entail the control module 820 controlling the linear actuator 853 to pull or otherwise move the chassis 645 back toward the home position. Movement of the chassis 645 may prepare the chamber 139 for receiving subsequent items 263. Additionally or alternatively, movement of the chassis 645 may retract the chassis 645 away from a state of extending out of the chamber 139 and away from a position that might otherwise occupy a portion of the receiving zone 107 or might otherwise interfere with operation of the packaging system 105. The act 940 of re-setting the discharging system may occur prior to, concurrently with, or after the act 935 of feeding a second item set into the second chamber.

At act 945, the process 900 can include orienting the rotary hub in a third orientation. This may correspond to the rotary hub 247 arranging the second chamber 139 in a subsequent position for acting on the second set of items therein. In some examples, this may entail moving the second chamber 139 to the upright position, discharging position, and/or other second position aligned for discharging an item 263. For example, the control module 820 may control the rotational actuator 249 to turn the spindle 251, the collar 253, and/or otherwise cause rotation to provide a suitable second alignment for the rotary hub 247. In the third orientation, a third chamber 139 may also be positioned in the recumbent position, loading position, and/or other first position aligned for receiving an item 263, for example, such that multiple item-moving actions can be performed relative to a single orientation of the hub 247.

Additionally or alternatively, the act 945 may entail orienting the second chamber in an emptying position (e.g., which may correspond to a position occupied by chamber 139D in FIG. 3). In the emptying position, the second set of items may exit the second chamber 139 through a same open top through which they were loaded, rather than being discharged out through a different open end. The action 945 if involving such emptying can additionally or alternatively include and/or be supplemented with an act of operating a output conveyor 131 (such as by the control module 820 interfacing with the feeder control 804) to remove emptied items 263 for further processing.

At act 950, the process 900 may include packaging the item. For example, the act 950 may correspond to the control module 820 controlling the packaging system 105 to seal the item 263 inside packaging once received within the receiving zone 107 from the discharging system 143.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory loading system, comprising:
   a support frame defined relative to an up-down direction, a forward-backward direction, and a lateral direction;
   a rotary hub supported by the support frame and having an axis of rotation aligned along the forward-backward direction;
   a feeding system comprising one or more conveyors arranged for item transport along the lateral direction toward the rotary hub;
   a chamber rotatable by the rotary hub from a first recumbent position for receiving one or more items from the feeding system and to a second upright position, wherein the chamber is included in a plurality of chambers supported by and spaced regularly about the rotary hub; and
   a discharging system comprising at least one pusher movable relative to the chamber in the second upright position so as to push the one or more items out of the chamber and along the forward-backward direction toward a receiving zone.

2. The inventory loading system of claim 1, wherein the receiving zone is defined by a packaging system configured to provide packaging forming an opening oriented to allow insertion along the forward-backward direction.

3. The inventory loading system of claim 1, wherein the chamber is bounded by walls that advance in response to movement of the pusher to eject contents of the chamber.

4. The inventory loading system of claim 1, further comprising:
   a chassis having at least a front face, a first lateral face, a second lateral face, and a bottom face;
   a bottom conveying surface fastened to the bottom face of the chassis;
   a first side conveying surface fastened to the first lateral face of the chassis; and
   a second side conveying surface fastened to the second lateral face of the chassis;
   wherein the chamber has bounds defined by the bottom conveying surface, the first side conveying surface, and the second side conveying surface;
   wherein the first side conveying surface and the second side conveying surface are spaced apart from one another to define a top opening of the chamber through which the one or more items are loadable into the chamber; and
   wherein a rear wall of the chamber is defined at least in part by the front face of the chassis and is movable by the pusher from a home position and toward an extended position so as to advance the bottom conveying surface, the first side conveying surface, and the second side conveying surface along with the rear wall of the chamber to decrease a size of the chamber and advance contents of the chamber along the forward-backward direction toward the receiving zone.

5. A method, comprising:
   conveying a first item set of one or items in a lateral direction toward and into a first chamber supported in a loading position by a rotary hub;
   rotating the rotary hub from a first orientation in which the first chamber is arranged in the loading position and into a second orientation in which the first chamber is arranged in a discharging position, wherein the rotating is about an axis of rotation oriented non-parallel to the lateral direction; and
   translating the first item set in a direction parallel to the axis of rotation of the rotary hub to move the first item set out of the first chamber in the discharging position.

6. The method of claim 5, wherein rotating the rotary hub from the first orientation and into the second orientation further comprises rotating a second chamber supported by the rotary hub into the loading position, and wherein the method further comprises:
   with the rotary hub in the second orientation, conveying a second item set of one or more items in the lateral direction toward and into the second chamber.

7. The method of claim 6, further comprising further rotating the rotary hub to a third orientation in which the second chamber is rotated past the discharging position and to an emptying position in which the second item set is emptied from the second chamber by movement under the effect of gravity.

8. The method of claim 5, wherein the rotating is by 90° or less.

9. The method of claim 8, wherein the rotating is by 72° or less.

10. The method of claim 5, wherein translating the first item set out of the first chamber comprises discharging the first item set through an open output face of the first chamber that is different from and non-parallel to an open input face through which the first item set was fed into the first chamber.

11. The method of claim 5, wherein translating the first item set out of the first chamber comprises:
- translating a chassis through the first chamber; and
- as a result of the chassis being translated, advancing conveying surfaces that are fastened to the chassis and that define boundaries of the first chamber.

12. A system comprising:
- a rotary hub rotatable about an axis of rotation;
- a first chamber supported by the rotary hub and having walls that bound the first chamber and define an open top and an open end non-parallel to the open top;
- a second chamber spaced apart along a periphery of the rotary hub from the first chamber;
- a rotational actuator configured to rotate the rotary hub from a first orientation and to a second orientation, wherein in the first orientation the first chamber is arranged in a first position aligned for receiving a first item set of one or more items through the open top, and wherein in the second orientation the first chamber is arranged in a second position and the second chamber is arranged in the first position; and
- a linear actuator configured to move in a direction having a component parallel to the axis of rotation to discharge the first item set from the first chamber in the second position.

13. The system of claim 12, wherein the rotational actuator is further configured to rotate the second chamber to the second position and wherein the linear actuator is further configured to discharge a second item set from the second chamber in the second position.

14. The system of claim 12, wherein the first chamber is bounded by conveying surfaces movable in response to movement by the linear actuator.

15. The system of claim 12, wherein the linear actuator is positioned over the open top of the first chamber in the second position.

16. The system of claim 12, further comprising a boom having an anchoring portion coupled with the rotary hub and a cantilevered portion that extends outwardly from the rotary hub and forms or supports a bottom portion of the first chamber.

17. The system of claim 12, wherein the first chamber and the second chamber are included in a set of at least four chambers equally spaced about the rotary hub.

18. The system of claim 17, wherein the set of at least four chambers includes at least five chambers.

19. The system of claim 12, further comprising an outbound conveyor arranged beneath an emptying position to which the first chamber is rotatable to empty contents of the first chamber through the open top of the first chamber under the effect of gravity.

20. The system of claim 12, further comprising a fork and a tab receivable within the fork in response to the rotation of the first chamber to the second position, wherein engagement of the fork with the tab imparts motion from the linear actuator to a chassis in the first chamber.

* * * * *